(12) United States Patent
Wang

(10) Patent No.: US 6,902,792 B2
(45) Date of Patent: Jun. 7, 2005

(54) PAD STRUCTURE

(76) Inventor: Swei Mu Wang, No. 3, Lane 229, Daya Rd., Daya Shiang, Taichung 428 (TW)

( * ) Notice: Subject to any disclaimer, the term of this patent is extended or adjusted under 35 U.S.C. 154(b) by 74 days.

(21) Appl. No.: 10/440,179

(22) Filed: May 19, 2003

(65) Prior Publication Data

US 2004/0234727 A1 Nov. 25, 2004

(51) Int. Cl.[7] .............................. B32B 3/00; B32B 1/00; B32B 3/30; B32B 3/12; B32B 3/28
(52) U.S. Cl. ........................ 428/174; 428/180; 428/178; 5/420
(58) Field of Search ................................. 428/178, 174, 428/187, 180; 5/420, 731, 736, 500, 502, 901

(56) References Cited

U.S. PATENT DOCUMENTS 5,987,669 A * 11/1999 Leggett et al. .................. 5/502

* cited by examiner

Primary Examiner—Harold Pyon
Assistant Examiner—Catherine A. Simone
(74) Attorney, Agent, or Firm—Charles E. Baxley

(57) ABSTRACT

A pad structure with arc bridges like structure that can provide sufficient elasticity and strength. The pad structure mainly contains: a frame, a first layer and a second layer. The frame contains plural interlaced members. Each of the members contains a top surface, a bottom surface and two side surfaces. The frame has plural grids therein. The first layer contains a bottom surface having a first portion and a second portion. The first portion of the bottom surface of the first layer is united on the top surfaces of the frame. The first layer forms plural upwardly protrudent arc surfaces on top of the grids. The second layer contains a top surface united on the bottom surfaces, the side surfaces of the frame and the second portion of the bottom surface of the first layer.

7 Claims, 4 Drawing Sheets

PAD STRUCTURE

TECHNICAL FIELD

This invention relates generally to a pad structure, in particular, to provide a pad structure having upwardly protrudent arc surfaces for providing sufficient elasticity.

BACKGROUND OF THE INVENTION

Pad structure has been widely used in different occasions for example shoe soles, seat pads and so on. Pad can be made of different materials for example: plastic, cloth and leather. Cloth made pad has many disadvantages. First cloth is not waterproof. Second, cloth is easily torn up. Third cloth cannot prevent users from slip. Forth cloth is not wear resistant. Leather is not well waterproof and the patterns on leather are very limited. Leather is also slippery. Plastic cannot provide users good touch feeling. The strength of plastic is comparatively weak. Plastic made pads are most planar on their surface and therefore cannot provide good elasticity. There are several conventional pad structures to overcome the drawbacks of the simple cloth, plastic, leather pad structures.

One conventional pad structure is mainly made through the steps: adhering a waterproof film to a weave cloth, cooling and pressing the combined water-proof film and weave cloth. The pad structure has planar surface. Although the pad structure is waterproof, it cannot provide sufficient elasticity.

Another conventional pad structure is mainly made through the steps: applying a foamable material to a weave cloth, foaming the foamable material. When the foamable material is foamed, its is bounded to the weave cloth. Although the padstructure can provide some elasticity, it is not waterproof and the foamable material is easily damaged by sunlight.

Further a conventional pad structure mainly contains a rubber body united with a cloth. The rubber has three-dimensional patterns thereon. The rubber is water-proof. However the rubber can provide only small elasticity. Besides rubber is easily aged by contacting water and sunlight.

The other pad structures include structure unifying weave cloth and plastic body and the structure of plastic sheet with protrutions thereon. These pad structures' elasticity is not sufficient to give human body proper support Therefore a pad structure that can provide sufficient elasticity and the surfaces of the pad can prevent users from slipping and its surfaces are waterproof is needed.

SUMMARY OF INVENTION

It is therefore an objective of the present invention to provide a pad structure that can provide sufficient elasticity.

Another object of the invention is to provide a pad structure that can prevent users from slipping.

The present invention, briefly summarized, in one embodiment discloses a pad structure. The pad structure mainly contains: a frame, a first layer and a second layer. The frame contains plural interlaced members. Each of the members contains a top surface, a bottom surface and two side surfaces. The frame has plural grids therein. The first layer contains a bottom surface having a first portion and a second portion. The first portion of the bottom surface of the first layer is united on the top surfaces of the frame. The first layer forms plural upwardly protrudent arc surfaces on top of the grids. The second layer contains a top surface united on the bottom surfaces, the side surfaces of the frame and the second portion of the bottom surface of the first layer.

BRIEF DESCRIPTION OF DRAWINGS

The invention will be more clearly understood after refer to the following detailed description read in conjunction with the drawings wherein.

DETAILED DESCRIPTION OF PREFERRED EMBODIMENTS

Figure 1:
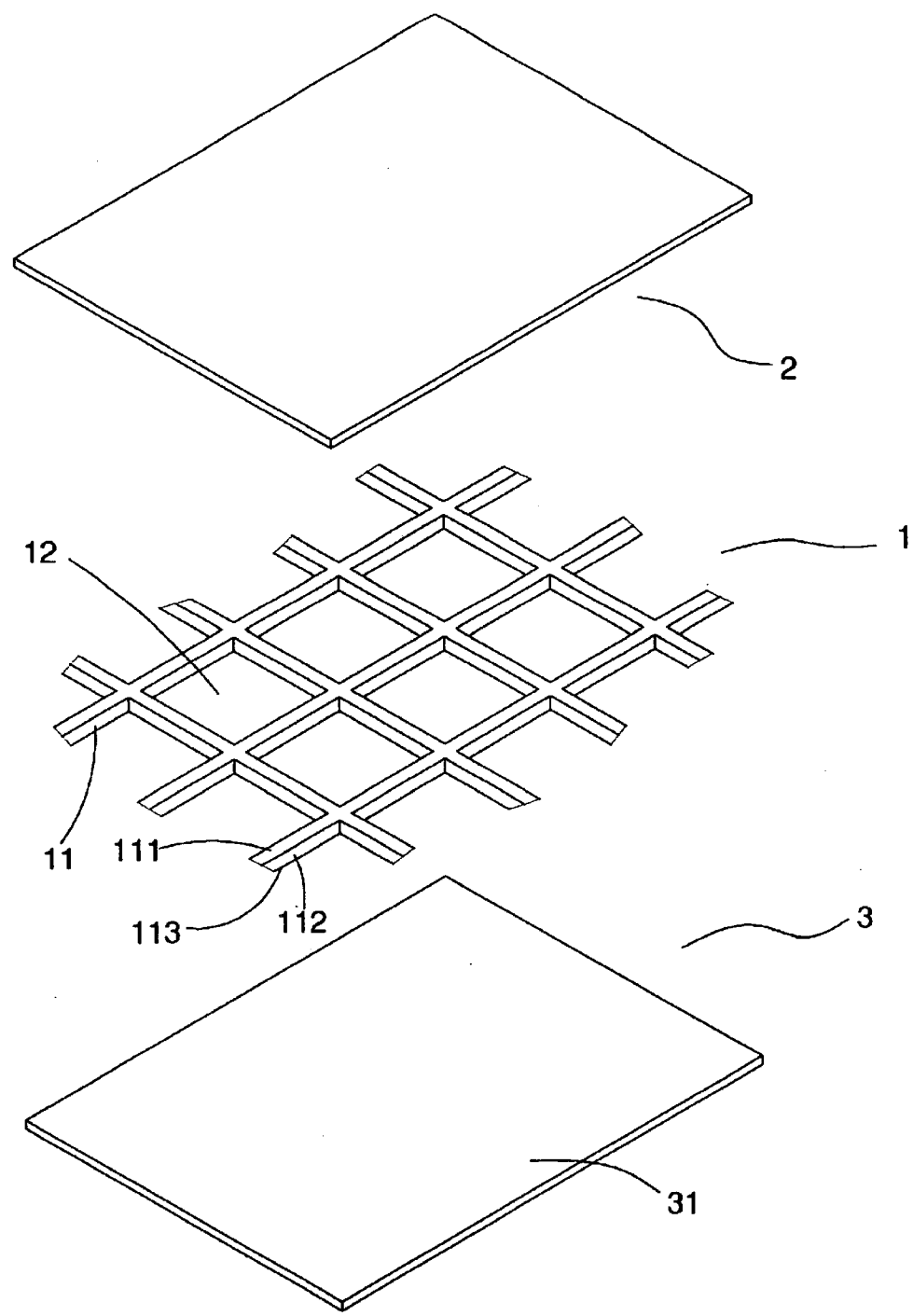
FIG. 1 is a exploded view of an embodiment.
Figure 2:
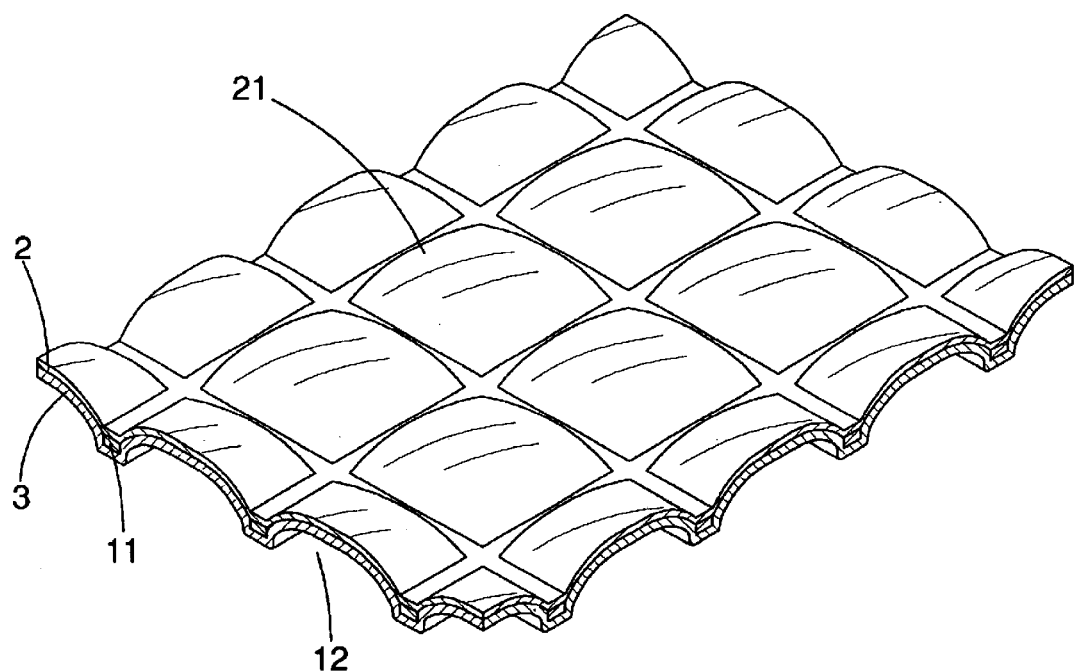
FIG. 2 is a perspective view the embodiment.
Figure 3:
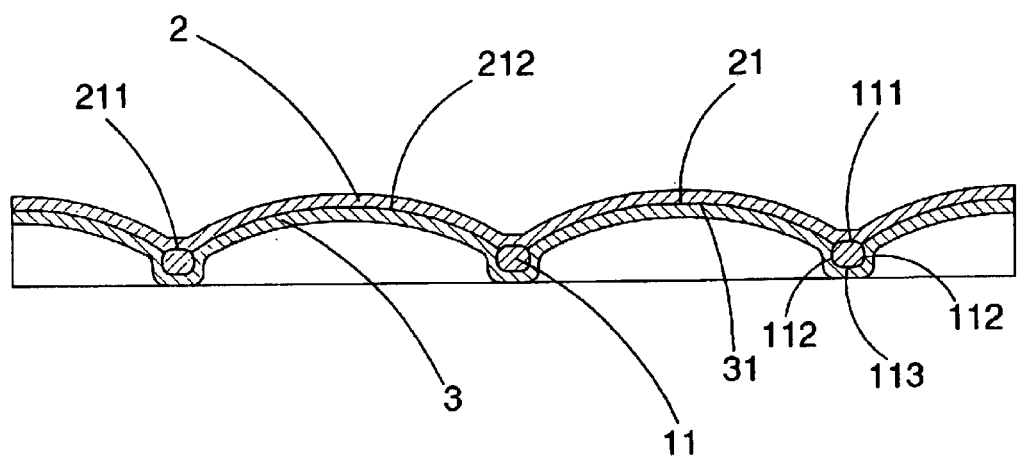
FIG. 3 is a cross sectional view of the embodiment.

With reference to FIG. 1 to FIG. 3, an embodiment of present invention is illustrated. The embodiment is a pad structure, which mainly contains a frame1, a first layer 2 and a second layer 3. The frame 1 contains plural interlaced frame members 11. Each of the frame members 11 contains top surface 111, bottom surface 113 and two side surfaces 112. The frame 1 has plural grids 12 therein. The first layer 2 contains a bottom surface 21 having a first portion 211 and a second portion 212. The first portion 211 of the bottom surface 21 of the first layer 2 is united on the top surfaces 111 of the plural interlaced frame members 11. The first layer 2 forms plural upwardly protrudent arc surfaces 21 on top of the grids 12. The second layer 3 contains a top surface 31 united on and secured the bottom surfaces 113, the side surfaces 112 of the members 11 and the second portion 212 of the bottom surface 21 of the first layer 2, such that the second layer 3 is also protrudent upwardly in the grids 12. The first layer of the pad structure is made of a heat deformable, light pervious, water proof and wear resistant material. The second layer of the pad structure is made of a heat deformable material. The second portion 212 of the bottom surface 21 of the first layer 2 is the place not united with top surfaces 111.

Figure 4:
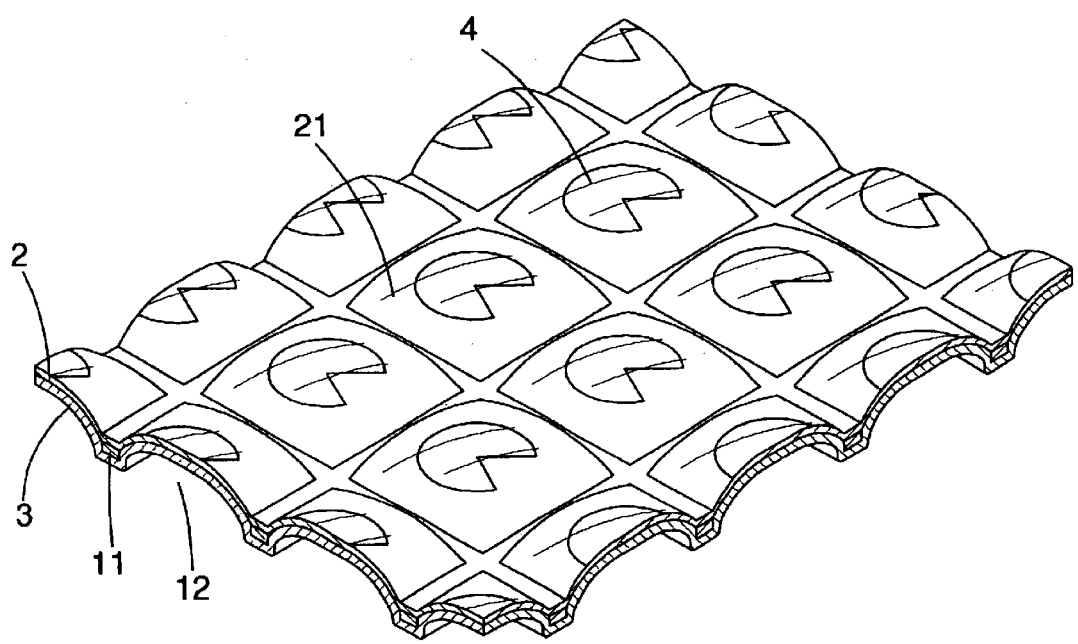
FIG. 4 is a perspective view of another embodiment.

With reference to FIG. 4, another embodiment with the same structure of the embodiment mentioned above. The first layer 2 of the embodiment further has patterns 4 thereon corresponding to the grids 12, thereby the patterns 4 can be shown on the upwardly protrudent arc surfaces 21. It can also be arranged in a way the second layer 3 has patterns thereon, whereby the patterns can be shown corresponding to said upwardly protrudent arc surfaces 21.

One of the methods for making a pad structure comprises: providing a frame 1 comprising plural interlaced members 11 having grids 12 therein, a first heat deformable layer 2 and a second heat deformable layer 3; placing the first heat deformable layer 2 on top of the frame 1 and the second heat deformable layer 3 on bottom of the frame 1; fixing peripheries of the first heat deformable layer 2, the frame 1 and the second heat deformable layer, heating and compressing the first heat deformable layer 2, the frame 1 and the second heat deformable layer 3, and making vacuum at the side of the first heat deformable layer 2, thereby forming upwardly protrudent arc surfaces 21 on top of the grids 12. Since the side of the first heat deformable layer in a mold is vacuum, the side of the second layer 3 is pressed by air pressure. Thereby the upwardly protrudent surfaces 21 are formed. When heating the first heat deformable layer 2, the frame 1 and the second heat deformable layer 3, they melt because of the heat. Thereafter they are compressed and united together.

There are many advantages of the invention. For example, the structure of the upwardly protrudent surfaces 21 works like arc bridges that can absorb vibrations and provide elasticity. The spaces between the upwardly protrudent surfaces 21 help air flows between human body and the pad structure when human body is pressed against the pad structure. The members 11 work like columns of bridges that convey force that human body presses on the upwardly protrudent surfaces 21 to supporting grounds. Because both sides of the pad structure are not planar, they provide more frictions surfaces thereon. The material used can prevent water from invading the pad structure and also is wear resistant. The structure of the pad is similar to plural arc bridges united together. The structure can resist vertical forces as well as shear forces. Therefore can be used for longer period of time.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

I claim:

1. A pad structure comprising:
   a frame comprising plural interlaced members, each of said interlaced members including a top surface, a bottom surface and two side surfaces, said frame including plural grids therein;
   a first layer made of heat deformable material and comprising a bottom surface having a first portion and a second portion, said first portion of said bottom surface of said first layer being secured to said top surfaces of said interlaced members of said frame, said first layer forming plural upwardly protrudent arc surfaces on top of said grids and in said second portion of said bottom surface of said first layer that is not secured to said top surfaces of said interlaced members of said frame; and
   a second layer made of heat deformable material and comprising a top surface secured to said bottom surfaces and said side surfaces of said interlaced members and also secured to said second portion of said bottom surface of said first layer, and said second layer protrudent upwardly in said grids.

2. The pad structure of claim 1, wherein said first layer is made of a light pervious material.

3. The pad structure of claim 1, wherein said first layer is made of a wear resistant material.

4. The pad structure of claim 1, wherein said first layer is made of a waterproof material.

5. The pad structure of claim 1, wherein said grids are in the figure of rectangular.

6. The pad structure of claim 1, wherein said first layer has patterns thereon corresponding to said grids, and shown on the upwardly protrudent are surfaces.

7. The pad structure of claim 1, wherein said second layer has patterns thereon, and shown corresponding to said upwardly protrudent arc surfaces.

* * * * *